(12) United States Patent
Hammer

(10) Patent No.: US 8,281,463 B2
(45) Date of Patent: Oct. 9, 2012

(54) INTERMEDIATE FIXING ELEMENT

(75) Inventor: Pavel Hammer, Mössingen/Oschingen (DE); Marion Hammer, legal representative, Mössingen (DE)

(73) Assignee: Aplix, Paris (FR)

( * ) Notice: Subject to any disclaimer, the term of this patent is extended or adjusted under 35 U.S.C. 154(b) by 1168 days.

(21) Appl. No.: 10/592,635

(22) PCT Filed: Mar. 18, 2005
(Under 37 CFR 1.47)

(86) PCT No.: PCT/FR2005/000663
§ 371 (c)(1),
(2), (4) Date: Sep. 11, 2006

(87) PCT Pub. No.: WO2005/056864
PCT Pub. Date: Oct. 20, 2005

(65) Prior Publication Data
US 2008/0229556 A1    Sep. 25, 2008

(51) Int. Cl.
*A44B 18/00* (2006.01)
(52) U.S. Cl. .......................... 24/452; 264/167
(58) Field of Classification Search .............. 24/442, 24/306, 450, 452; 428/100; 264/167
See application file for complete search history.

(56) References Cited

U.S. PATENT DOCUMENTS

| | | | | |
|---|---|---|---|---|
| 3,808,648 | A | * | 5/1974 | Billarant et al. ............... 24/450 |
| 5,368,549 | A | * | 11/1994 | McVicker ......................... 602/6 |
| 5,656,226 | A | * | 8/1997 | McVicker ..................... 264/318 |
| 6,163,939 | A | * | 12/2000 | Lacey et al. ..................... 24/452 |
| 6,187,247 | B1 | | 2/2001 | Buzzell et al. |
| RE37,338 | E | * | 8/2001 | McVicker ......................... 602/6 |
| 6,451,239 | B1 | | 9/2002 | Wilson .......................... 264/491 |
| 7,716,792 | B2 | * | 5/2010 | Clarner ............................ 24/452 |
| 2002/0125605 | A1 | | 9/2002 | Lacey et al. ................... 264/167 |
| 2004/0137192 | A1 | * | 7/2004 | McVicker ..................... 428/100 |

FOREIGN PATENT DOCUMENTS

| | | |
|---|---|---|
| EP | 0 464 754 | 1/1992 |
| EP | 0 465 983 | 1/1992 |
| EP | 464754 A1 * | 1/1992 |

* cited by examiner

*Primary Examiner* — James Brittain
(74) *Attorney, Agent, or Firm* — Renner, Kenner, Greive, Bobak, Taylor & Weber

(57) ABSTRACT

The inventive intermediate fixing element (1) is embodied in one piece by injection moulding and comprises a plate (2) which is substantially flat and comprises a first or top surface and a second or lower surface, at least one anchoring element (6), for example in the form of a herringbone or a tree produced directly by the top surface moulding and hooks (7) which are produced directly by the lower surface moulding and whose shape, sizes and thermoplastic material are selected in such a way that said hooks, after being shaped in a mould and extracted therefrom, substentially recover the initial shape thereof, wherein said hooks are sufficiently flexible in order to be bent during extraction from the mould.

12 Claims, 3 Drawing Sheets

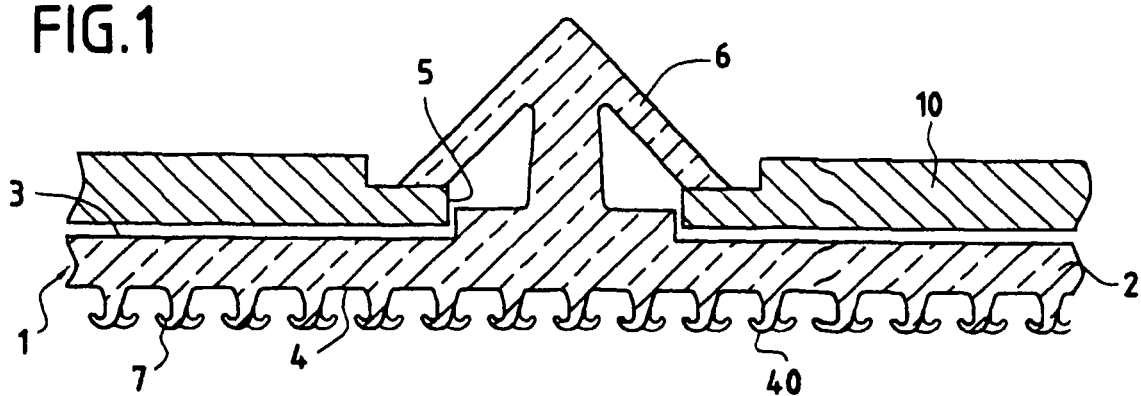
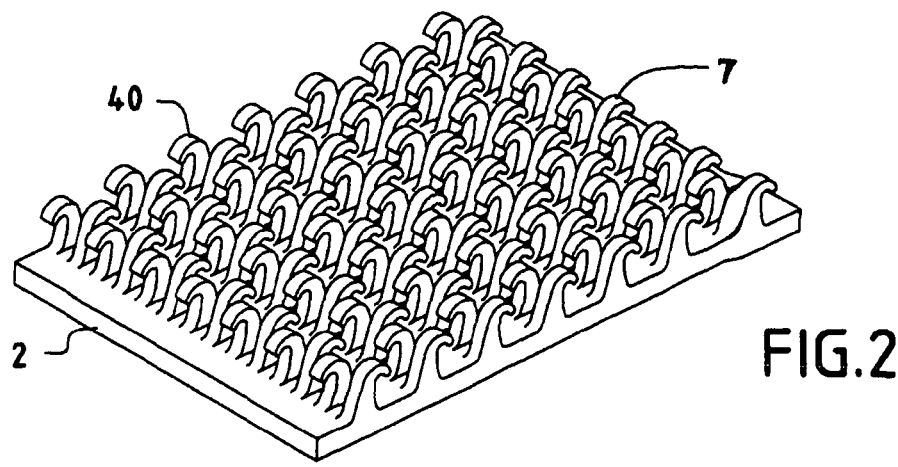
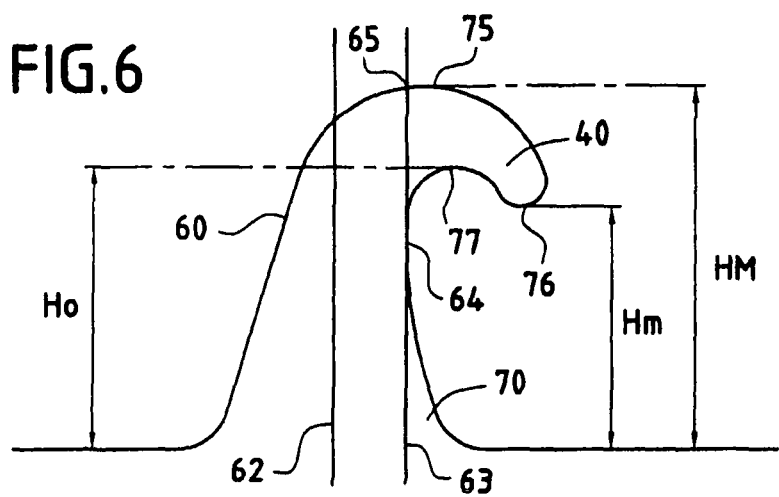

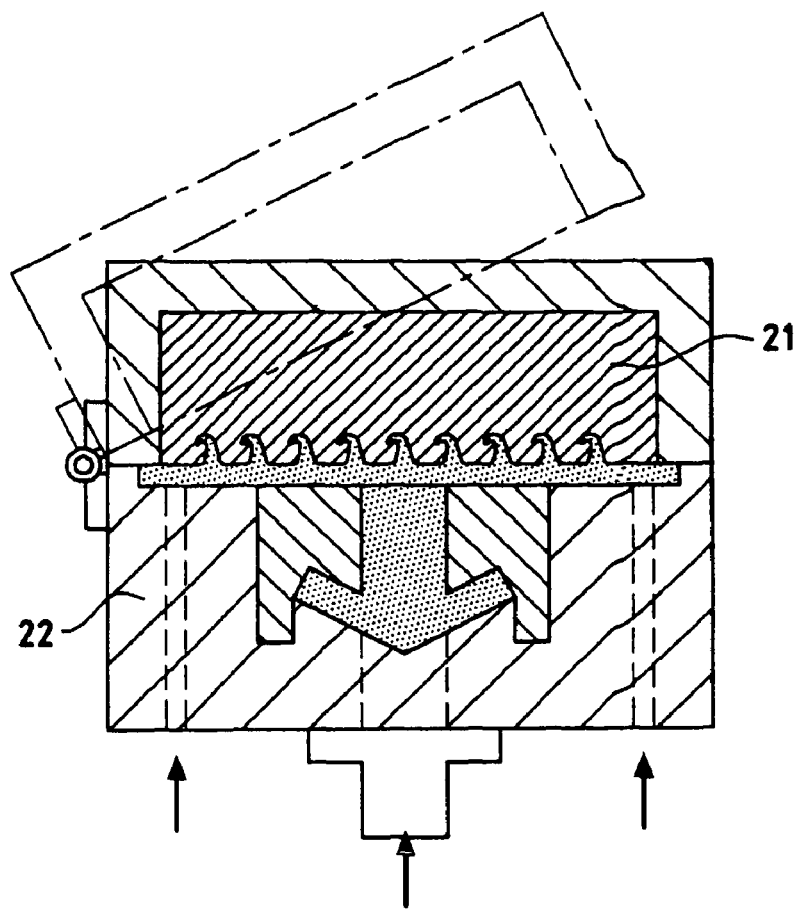
FIG.3A
FIG.3B
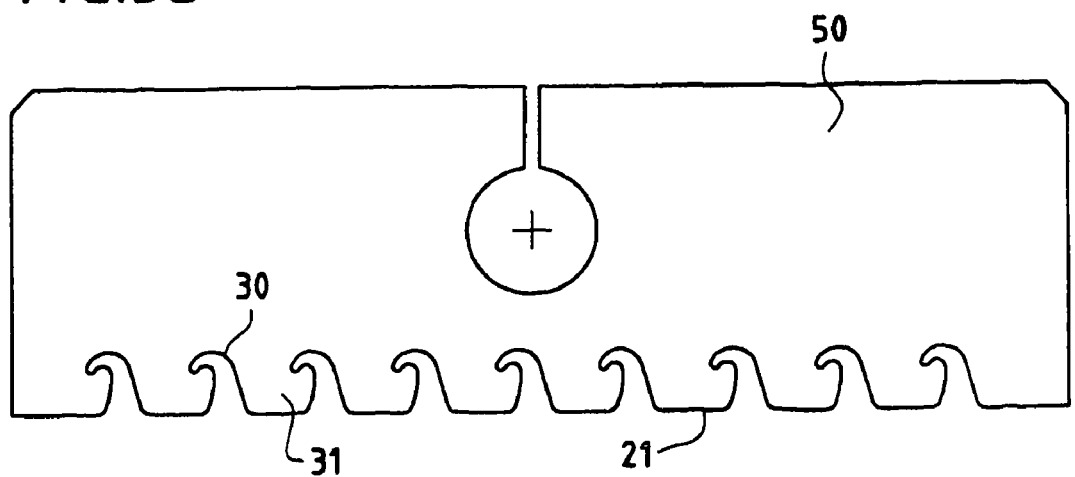

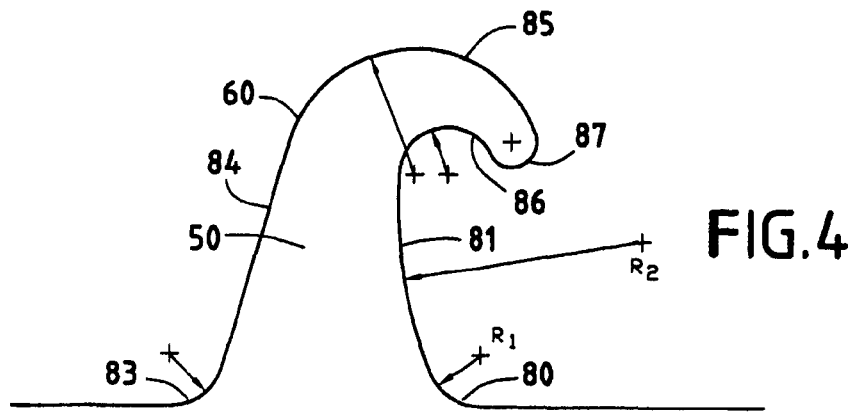
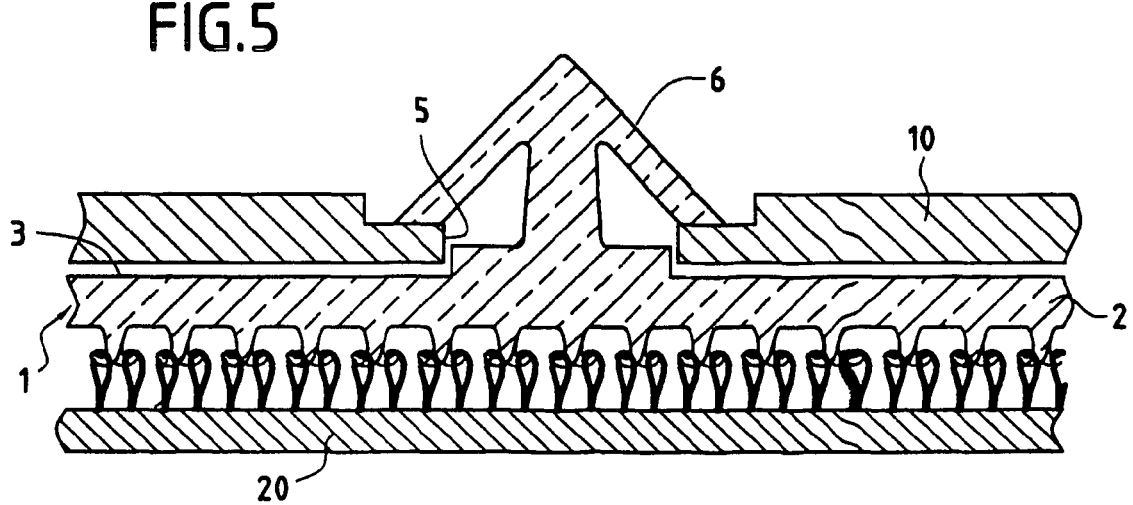

INTERMEDIATE FIXING ELEMENT

TECHNICAL FIELD

This invention relates to an intermediate fastening element which is intended to provide the connection between a first element and a second element, and comprising a plate from which on the one hand hooks project for fastening through cooperation with loops of the second element and on the other hand an anchoring element, particularly in the shape of a fir tree, for fastening to the first element. This invention also relates to an assembly constituted by a first element, a second element and an intermediate fastening element according to the invention.

BACKGROUND ART

For example, in the field of the motor car, there is often a need to fasten to a first element, for example to a roof, a second element, for example a vehicle roof element. It is desirable, for example in the case of repair, to be able to remove the vehicle roof element.

In order to do this, an intermediate fastening element is known which is constituted by a flat plate having a first surface and a second surface opposite the first surface, an element for example in the shape of a fir tree, which can engage in a complementary hole of the first element, being related to the first face (which will be referred to below as the upper face), while hooks, also related, project from the second face in order to cooperate for example with loops coming from a fabric to be fixed in order to ensure the fastening of the fabric to the first element which can for example be a roof of a motor car.

The production of this type of intermediate fastening element is long and complex and not well adapted to large-scale industrial production, particularly by reason of the fact that these intermediate fastening elements are not realised from a single element.

Fastening elements of this type are also known, for example from EP0465993, EP0464754 and U.S. Pat. No. 6,187,247, comprising a flat plate from which hooks formed by injection moulding project from one element. In order to allow the production through moulding of the hooks of one element with the plate, it is necessary for the plate itself to be sufficiently flexible to allow the ejection of the hooks from their moulds. In use, the fastening of the hooks of these fastening elements with loops is of poor quality, having a tendency to become unhooked in the long term due to the effect of vibrations, particularly in a motor car, by progressive peeling.

DISCLOSURE OF THE INVENTION

This invention aims to overcome the drawbacks of the prior art by proposing a fastening element of the type previously described which allows an excellent fastening to be obtained, even in the long term, which does not deteriorate as a result of vibrations and which can still be produced rapidly and cost-effectively.

According to the invention, the intermediate fastening element includes a substantially flat plate having an upper face and a lower face, at least one anchoring element projecting from the upper face, and hooks arising through moulding from a region of the lower face, each of said hooks having a maximum height HM, a minimum height Hm, and a fastening height Ho, wherein said plate is substantially rigid and the hooks have a profile, the profile being (HM-Ho)/(HM-Hm), which is equal to or greater than 0.55.

Embodiments are the subject of the dependent claims.

In this application the term "substantially rigid" is intended to mean a plate which at least holds its shape itself, and in particular which cannot bend owing to the effect of its own weight. "Substantially rigid" is preferably intended to mean a plate which cannot be irreversibly bent, in particular beyond an angle of curvature of a few degrees, in particular beyond 15°, preferably 10°, more preferably 5°, whereby the angle of curvature is the angle between a plane on which a part of the plate is maintained and the tangent to the plate at the most remote point on the plane on which said one part is maintained.

Covering substantially the lower face is understood to mean covering at least 65% of the surface area of the lower face.

"Hook region" is understood to be the region delimited by a line which is closed, passing via the perpendicular projections of the axes of hook stems, from the base of which the hooks project and which is such that all the perpendicular projections of the axes of hook stems are situated on the line or inside it.

For a hook, one defines in longitudinal section, perpendicularly to the lower face:
- the (imaginary) axis of the hook as being the line perpendicular to the lower face and passing via the middle of the base of the hook at the level of the lower face;
- the right (or left) (imaginary) delimitation line segment between the stem and the head of the hook as being the first (imaginary) line segment parallel to the axis of the hook, starting from the axis and offsetting to the right, which cuts the envelope curve at two points and which extends between these two points;
- the maximum height HM of the hook as being the distance measured perpendicularly to the lower face, from the lower face to the highest point of the envelope curve in said section in longitudinal section defining the hook;
- the minimum height Hm of the hook as being the distance measured perpendicularly to the lower face, in said section in longitudinal section, from the lower face to the most remote point of the delimitation segment of the envelope curve defining the hook head; and
- the fastening height Ho of the hook, as being the distance, measured perpendicularly to the lower face, from the lower face to the highest point of the section of the envelope curve defining the head and which extends from the lowest point delimiting the delimitation segment of the head as far as the most remote point of the head of the delimitation segment in said section in longitudinal section.

In borderline cases there can be equality between the highest point and/or the lowest point and/or the highest fastening point.

The profile of the head is thus defined as being the ratio (HM-Ho)(HM-Hm). At the upper limit, this profile is equal to 1, which corresponds to a horizontal hook head or one which is oriented upwards (in these two cases, Hm=Ho applies).

By thus providing such forms and dimensions of the hooks, it is easy to produce in a single moulding stage the intermediate fastening element with removal of the hooks from the moulds, in spite of the rigidity of the plate.

This invention also relates to an assembly constituted by a first element, a second element and an intermediate fastening element according to the invention, the anchoring element being anchored to the first element, whereas the second element comprises loops which cooperate with the hooks coming from the lower face of the intermediate fastening element.

According to another preferred embodiment of the invention the hooks are arranged in rows and columns, for example being arranged alternately in one direction and in the other, from one row to the next, from one column to the next.

According to a preferred embodiment of the invention, the hooks are realised in such a way that the hook region covers more than 70% of the whole lower face of the intermediate fastening element, preferably more than 80%, and more preferably more than 90%, particularly 100%.

According to a particularly preferred embodiment of the invention, the hook is constituted by a stem and a head section, the head projecting laterally from the stem and the stem widening from the head towards the lower face.

This invention also relates to a method of production in order to obtain through moulding in one stage an intermediate fastening element according to the invention as defined in claim 10 and to an assembly according to claim 9.

BRIEF DESCRIPTION OF THE DRAWINGS

Solely by way of example, a preferred embodiment of the invention is described below by reference to the drawings in which:

FIG. 1 is a sectional view of an intermediate fastening element according to the invention anchored in a vehicle roof, FIG. 2 is a perspective view of a part of the intermediate fastening element according to the invention, FIG. 3a shows a mould such as that used to obtain an intermediate fastening element according to the invention, FIG. 3b shows a part of the mould of FIG. 3a, FIG. 4 shows the state of a hook of the intermediate fastening element once complete, FIG. 5 shows an assembly of a first element, a second element and an intermediate fastening element according to the invention, and FIG. 6 shows the hook of FIG. 4 on a smaller scale.

PREFERRED EMBODIMENT FOR CARRYING OUT THE INVENTION

In FIG. 1, an intermediate fastening element 1 according to the invention is shown. The intermediate fastening element 1 is constituted by a plate 2 which is substantially rigid, that is to say having a form which cannot bend in itself or on account of the effect of its own weight. Besides, the plate cannot be irreversibly bent beyond an angle of curvature of 5°. This angle of curvature is defined in the following way. The plate is placed on a plane, maintaining it on one of its edges, whereas an opposing edge is pulled upwards to bend the plate. The angle of curvature is the angle between the tangent to the part of the plate at the edge which has been pulled and the plane.

The plate 2 is in the shape of a square, having an upper face 3 and a lower face 4. Coming from the upper face 3 is an anchoring element 6 in the shape of a fir tree, while hooks 7 come from the lower face 4. Preferably, the hooks 7 cover at least half of the surface area of the lower face 4 upon observation directly from above. The hooks 7 are preferably arranged in rows and columns whereby the hooks are arranged, as can in seen in FIG. 2, with an alternate arrangement of their heads according to the row. The intermediate fastening element is anchored in a roof element 10 of a motor car by insertion of the anchoring element 6 into a hole 5 and snap-in connection. As can be seen in FIG. 5, an element, for example a roof element 20, is fixed to the hooks of the intermediate fastening element by means of loops, for example loops which are knitted in a fabric fixed to the roof element. The plate is flat in the drawings. It could also for example be in the form of a roof or dome, for example in the form of a spherical or cylindrical dome, with for example convexity facing the side of the hooks and concavity on the side of the fir tree elements Even if the plate is in the form of a dome, it is substantially rigid.

In FIG. 3a an upper section 21 of a mould 22 is shown for forming the hooks. This upper section of the mould comprises cavities 30 having a complementary form to that of the hooks. Once the thermoplastic material has been injected into the mould, solidification is allowed and then the upper part 21 of the mould 22 is removed. During this extraction, the hooks 7 straighten partially in an instantaneous way when they are withdrawn from the mould 22. Then, after a very short time lapse, the hooks 7 return through elasticity to their curved formed which they had in the mould.

In order to form the upper section 21 of the mould, lamellas 50 are used (see FIG. 3B) which are stacked one on top of the other, whereby each lamella comprises cavities 30 on one section, said cavities being separated from each other by full intermediate sections 31. The cavities 30 are thus easy to realise through machining of the lamellas 50. Once they have been stacked one on top of the other, with an offset such that a cavity 30 is contiguous with two intermediate sections, a matrix of cavities 30 is obtained to form the hooks.

The hooks 7 are moulded for example in polypropylene. The hook 7, upon leaving the mould, has a tendency to become less hook-shaped, that is to say the head 40 of the hook 7 tends to straighten. This head 40 then lowers to assume its final shape. This hook comprises on the one hand a stem section 50 and on the other hand a head section 40. In the cross-section from above the stem thus has a rectangular shape of which the surface area dimensions decrease from the base to the head.

In FIGS. 4 and 6 a hook according to the invention is shown in longitudinal section. In the plan of the drawings there is thus defined an envelope curve 60 of the hook. For the hook 7, the (imaginary) axis 62 of the hook is defined as being the line perpendicular to the lower face 4 and passing via the middle of the base 61 of the hook.

The (imaginary) delimitation line on the right of the hook head is defined as being the first line 63 parallel to the axis 62 of the hook, starting from the axis 62 and offsetting to the right, which cuts the envelope curve 60 at two points (64 and 65). The section of the hook 7 to the right of the line 63 and above the point 64 is called the head 40 of the hook. In the same way an (imaginary) delimitation line on the left is defined. In the case of FIG. 4, this left curve can be defined for the hook which is situated behind the hook 7. In the case of the hook 7, this left delimitation line does not exist. In the case of a hook having a double head, there would thus be one delimitation line on the left and one on the right. The stem 50 of the hook is defined, in the case in which a single delimitation line can be defined, as the section of the hook which is situated on the other side of the segment 64, 65 of the delimitation line 63 (that is to say to the left of the line 63 in the case of the hook 7). In the case of a double-headed hook, the stem will be the section of the hook which is situated between the two left and right delimitation lines. (In fact the two planes which form these two lines in the sectional view of FIGS. 4 and 6).

Preferably, the stem 50 widens (its width in the plan of FIG. 4 or 6 reduces) from the bottom to the top of the hook.

Besides, the right (or left) section 70 of the stem 50, that is to say the section of the stem between the axis 62 and the section of the envelope curve 60 which extends as far as the intersection of the envelope curve with the delimitation line 63 on the right (or left), widens.

In a cross-section seen from above, the stem and the right (or left) stem section have a rectangular form, the length of which (horizontal width of the stem in the plan of FIGS. 4 and 6) and/or thickness (according to the direction perpendicular to FIGS. 4 to 6) reduces from the base to the head. However, there can also be a constant thickness. In the same way, the head of the hook has a rectangular form as seen from above, with a thickness which is constant or reducing in cross-section from the bottom to the top.

For the head 40, the greatest thickness in height is defined as being, measured along the axis 62 of the hook, the difference between the maximum height HM of the head (distance from the lower face 4 to the highest point 75, measured parallel to the axis 62) and the minimum height Hm of the head (the distance from the lower face 4 to the lowest point 76 of the head of the hook).

As for the fastening height Ho, it is equal to the distance along the axis 62 between the lower face 4 and the highest point 77 of the envelope curve section defining the lower surface of the head 40.

The profile of the head is thus defined as being the ratio (HM-Ho) (HM-Hm). At the upper limit, this profile is equal to 1, whereby this corresponds to a horizontal hook head or one which is upwardly orientated (in both cases, Hm=Ho applies).

According to the invention the profile of the head is greater than 0.55, in particular greater than 0.60, preferably greater than 0.80 and more preferably greater than 0.9.

If at least the right (or left) section of the hook is widened, the right (or left) head profile is preferably greater than or equal to 0.55, more preferably greater than 0.60 and in particular is between 0.60 and 0.90, preferably between 0.65 and 0.85, for example 0.66.

In particular the envelope curve section defining the stem on the side of the head is curved and in particular is constituted by a first arc 80 of a circle (radius R1 preferably between 0.1 and 0.3 mm) and a second arc 81 of a circle with a greater radius R2 than R1 (radius R2 preferably being between 0.35 and 2 mm) which extends substantially until it cuts the right delimitation line 63, at a height which is at least equal to half of the height HM.

On the side opposite the head the section of the envelope curve defining the stem is constituted by an arc 83 of a circle which is preferably identical to the first arc 80 of a circle and a line 84 which is inclined with respect to the axis 62 substantially up to a height corresponding to the height at which the second arc 82 of a circle cuts the delimitation line 63 on the right.

The envelope section defining the head is constituted by an upper arc 85 of a circle (defining the upper surface of the head) and a lower arc of a circle 86 (defining the lower surface of the head) and an intermediate arc of a circle 87. The radius of the upper arc of a circle 85 is preferably between 0.19 and 0.65 mm, for example 0.52 mm, whereby the lower arc of a circle is preferably between 0.07 and 0.35 mm, for example 0.19 mm and the radius of the intermediate circle is preferably between 0.04 and 0.16 mm, for example 0.11 mm.

Preferably, the section of the envelope curve defining the head does not comprise a point of inflection (its first derived function is continued at any point). The absence of a pointed part in the head of the hook assists in the removal of the hook form the mould during its production.

The height HM is preferably between 0.25 and 2 mm, for example being equal to 1.43.

The height Hm is preferably between 0.1 and 1.05 mm, for example 0.91 mm.

The height Ho is preferably between 0.15 mm and 1.25 mm, for example 1.12 mm.

The width at the level of the plate 2 of the stem is preferably between 0.3 mm and 1.5 mm, for example 1.21 mm.

The width of the stem at the height of the intersection of the envelope curve with the delimitation line on the right (or left) is preferably between 0.22 and 0.70 m for example 0.45 mm.

The thickness at height HM-Ho is preferably between 0.10 and 0.50 mm, more preferably between 0.20 and 0.40 mm, for example 0.32 mm.

The thickness at the height of the base is preferably between 0.4 mm and 4 mm, more preferably between 1 and 2 mm.

The ratio of the thickness at the height HM-Ho over the thickness at the height of the base is less than 1, preferably less than 0.5, more preferably less than 0.3, in particular less than 02.

In order to form the anchoring element or pin or base 6, here in the form of a shaft, a conventional slide moulding method is used. In fact, there is generally only a single element of this type (see two or three), to be formed on the back of the fastening element and the moulding slides are not therefore too complex to realise and to use (casing, de-casing), contrary to the case of the formation of the hooks which, because they have smaller dimensions and are in a greater number, cannot be realised simply and easily by such a slide moulding system.

In longitudinal section (FIGS. 4 or 6 for example) the hooks are in the form of the crest of a wave. They are constituted by a stem 50 defined by two lateral walls (corresponding to sections 80, 81, 82, 83, 84, 85) and two front and rear frontal walls (not visible in the drawing) in order to form a sort of parallelepiped or dihedron.

The thickness measurement (perpendicularly with respect to FIG. 4) of the head is preferably less than or equal to the thickness of the stem, in particular the thickness of the upper section of the stem.

Finally, the head can project from the stem in the same plane (that of the drawing) but in two opposing directions. A harpoon with two heads is thus obtained which is considered in the sense of this invention as a hook.

Polypropylenes or polyurethanes can be provided as suitable thermoplastic materials according to the invention. For example, for a polypropylene, a mixture of unsaturated polyester constituted by 50% homopolymer and 50% copolymer can be chosen, having a fluidity index in molten state of 22g/10mn and a flexural modulus of 130,000 to 150,000 psi. Other possible materials include a polypropylene of Atofina, PPC 5660, having a fluidity index in molten state of 7 and a flexural modulus of 175,000 psi, propylene copolymers of BP Amoco (Acclear 8949 and Acctuf impact copolymer 3934X) having fluidity index values in molten state of 35 to 100, and flexural modulus values of 190,000 to 250,000 psi; polystyrenes, acrylonitrile butadiene styrenes, high density polyethylene, low density linear polyethylene, polycarbonate. The indexes in molten state are between 1 and 100 and the flexural modulus values are between 30,000 and 1,140,000, preferably between 100,000 and 1,000,000, more preferably between 300,000 and 1,000,000.

Resins other than propylene-based resins which are suitable can be impact polystyrene, acrylonitrile butadiene styrene, nylon, high density polyethylene, low density linear polyethylene, polycarbonate and olefinic thermoplastic resins. Polypropylenes can also be provided which are reinforced by long glass fibres, having a very high flexural modulus (resin 30YM240/10010 having a flexural modulus of 856,000 psi and resin 40YM240/10010 having a flexural modulus of 1,140,000 psi, sold by StaMax). In this case, the long glass fibres do not migrate into the cavities (which are too small or too thin for the long fibres to penetrate therein), and a very rigid plate is obtained with, however, sufficiently flexible hooks to eject themselves form the cavities.

There is thus provided here by way of example an application in the motor car. However, the intermediate fastening element according to the invention can of course also be applied to other fields, for example the field of construction, furniture, aeronautics, transport, etc.

The invention claimed is:

1. Intermediate fastening element comprising a substantially flat plate having an upper face and a lower face, at least one anchoring element projecting from the upper face, and hooks arising through moulding from a region of the lower face, each of said hooks having a maximum height HM, a minimum height Hm, and a fastening height Ho, wherein said plate is substantially rigid and the hooks have a profile, the profile being (HM-Ho)/(HM-Hm), which is equal to or greater than 0.55, wherein said plate is made of only one material and said hooks are made of only said one material.

2. Element according to claim 1, characterised in that said hooks each have a head and a base spanned by a stem, the stem widening from the head to the base.

3. Element according to claim 1, characterised in that the profile of the hook is greater than or equal to 0.6.

4. Element according to claim 1, characterised in that the hook has a thickness at height HM-Ho that is between 0.10 and 0.50 mm.

5. Element according to claim 4, characterised in that said hooks each have a head and a base spanned by the stem, the base having a thickness between 0.4 mm and 4 mm.

6. Element according to claim 5, characterised in that the ratio of the thickness at the height HM-Ho to the thickness of the base is less than 1.

7. Element according to claim 1, characterised in that each hook includes an envelope curve defining a head, and the curve does not include a point of inflection.

8. Element according to claim 1, characterised in that the hooks and the plate are made of polypropylene, having a flexural modulus between 100,000 and 1,000,000 psi.

9. Assembly constituted by a first element, a second element, and an intermediate fastening element according to claim 1, the anchoring element being anchored to the first element, wherein the second element comprises loops which cooperate with the hooks coming from the lower face of the intermediate fastening element.

10. Production method for obtaining through moulding an intermediate fastening element according to claim 1, comprising providing a mould having cavities in a form which is complementary to that of the hooks, pouring thermoplastic material into the mould, allowing the thermoplastic material to solidify and removing the fastening element from the mould, characterised in that the cavities of a complementary form to that of the hooks have a form such that the hooks are flexible, the hooks deforming when extracted from the mould and then resuming substantially the form which they had in the mould.

11. The element according to claim 1, wherein said plate and said hooks are made of a thermoplastic material 12. The element according to claim 1, wherein said plate and said hooks are made of polypropylene.

\* \* \* \* \*